United States Patent
Yan et al.

(10) Patent No.: US 8,199,537 B2
(45) Date of Patent: Jun. 12, 2012

(54) DETECTING LIGHT LOAD CONDITIONS AND IMPROVING LIGHT LOAD EFFICIENCY IN A SWITCHING POWER CONVERTER

(75) Inventors: Liang Yan, Milpitas, CA (US); Xiaoyan Wang, Milpitas, CA (US); Jun Zheng, Shenzhen (CN); Junjie Zheng, Santa Clara, CA (US); Clarita Poon, Pleasanton, CA (US)

(73) Assignee: iWatt Inc., Campbell, CA (US)

( * ) Notice: Subject to any disclaimer, the term of this patent is extended or adjusted under 35 U.S.C. 154(b) by 548 days.

(21) Appl. No.: 12/388,709

(22) Filed: Feb. 19, 2009

(65) Prior Publication Data

US 2010/0208500 A1 Aug. 19, 2010

(51) Int. Cl.
*H02M 3/335* (2006.01)

(52) U.S. Cl. ............... 363/21.12; 363/21.15; 363/21.17; 363/21.18

(58) Field of Classification Search ............. 323/282, 323/284, 285, 286, 287; 363/21.12, 21.15, 363/21.17, 21.18
See application file for complete search history.

(56) References Cited

U.S. PATENT DOCUMENTS

| | | | | |
|---|---|---|---|---|
| 7,443,700 B2* | 10/2008 | Yan et al. | | 363/21.01 |
| 7,813,149 B2* | 10/2010 | Popescu et al. | | 363/21.05 |
| 2008/0315783 A1* | 12/2008 | Inaba | | 315/247 |
| 2010/0002480 A1* | 1/2010 | Huynh et al. | | 363/90 |

OTHER PUBLICATIONS

Texas Instruments, "UCC28600 8-Pin Quasi-Resonant Flyback Green-Mode Controller," Nov. 2005—Revised Dec. 2007 [Online] [Retrieved Jan. 21, 2009] Retrieved from the Internet <URL:http://focus.ti.com/lit/ds/symlink/ucc28600.pdf>.
STMicroelectronics, "L6565 Quasi-Resonant SMPS Controller," Jan. 2003 [Online] [Retrieved on Jan. 21, 2009] Retrieved from the Internet <URL:http://www.st.com/stonline/products/literature/ds/7587.pdf>.

* cited by examiner

*Primary Examiner* — Adolf Berhane
*Assistant Examiner* — Lakaisha Jackson
(74) *Attorney, Agent, or Firm* — Fenwick & West LLP

(57) ABSTRACT

A switching power converter detects low load conditions based on the ratio of a first peak current value for peak current switching in constant voltage regulation mode to a second peak current value for peak current switching in constant current regulation mode. The power supply load is considered to have a low load if the ratio is lower than a predetermined threshold. Once a low load condition is detected, the switching frequency of the switching power converter is reduced to a level that minimizes switching loss in the power converter. In addition, the switching power converter also adjusts the switching frequency according to the sensed input line voltage. An offset is added to the switching period to reduce the switching frequency of the switching power converter, as the input line voltage is increased.

20 Claims, 6 Drawing Sheets

DETECTING LIGHT LOAD CONDITIONS AND IMPROVING LIGHT LOAD EFFICIENCY IN A SWITCHING POWER CONVERTER

BACKGROUND OF THE INVENTION

1. Field of the Invention

The present invention relates to detecting light load conditions and improving light load efficiency in a switching power converter.

2. Description of the Related Arts

In switched mode power supplies, power loss results from either current conduction loss or switching loss in the power switch. Under heavy load conditions, current is high and thus conduction loss is the dominating factor. However, under light load conditions, current is low and thus switching loss is the dominating factor.

A conventional practice for improving light load efficiency in switching power converters is to reduce the switching frequency under light load conditions. In order to reduce the switching frequency under light load conditions, it is necessary to first detect such light load conditions accurately. Conventional switching power converters typically use the output signal of a control loop compensator in the switching power converters for detecting the light load conditions.

FIG. 1A conceptually illustrates a conventional flyback type AC-DC switching power converter. The power converter includes a transformer T1, diodes $D_1$ and $D_2$, a capacitor $C_O$, a switch Q1, resistors $R_1$, $R_2$, and a controller 102. Controller 102 generates the output drive signal 110 that drives the switch Q1. The AC power is received from an AC power source (not shown) and is rectified to provide the regulated DC input voltage $V_{IN}$. The input power is stored in transformer T1 while the switch Q1 is turned on because the diode $D_1$ becomes reverse biased. The rectified AC input power is then transferred to the load L1 across the capacitor $C_O$ while the switch Q1 is turned off because the diode $D_1$ becomes forward biased. Diode $D_1$ functions as an output rectifier and capacitor $C_o$ functions as an output filter. The resulting regulated output voltage $V_o$ is delivered to the load L1. Resistor $R_L$ is a pre-load that is typically used for stabilizing the output at no load conditions.

Controller 102 includes a Vout sense module 104, a loop compensation module 106, and an on-time (Ton) generator module 108. Controller 102 can employ any one of a number of well-known modulation techniques, such as pulse-width-modulation (PWM) or pulse-frequency-modulation (PFM), to control the ON and OFF states and duty cycles of power switch Q1. PWM and PFM are conventional techniques used for controlling the switching power converters by controlling the widths or frequencies, respectively, of the output drive pulse 110 driving the switch Q1 to achieve output power regulation. Thus, on-time generator 108 generates appropriate switch drive pulses 110 to control the on-times of power switch Q1 and regulate the output voltage $V_o$, using a feedback loop based on the sensed output voltage $V_O$ and the sensed primary side current Ip in previous switching cycles of the switching power converter.

The voltage $I_{SENSE}$ is used to sense the primary current Ip through the primary winding Np and switch Q1 in the form of a voltage across sense resistor $R_s$. On-time generator 110 uses the voltage $I_{SENSE}$ to implement peak current switching to limit the primary current Ip when it reaches a threshold value by generating control signal 110 to turn off the switch Q1.

The output voltage $V_o$ is reflected across the auxiliary winding Na of transformer T1, which is input to the Vout sense module 104 of controller 102 as the voltage $V_{SENSE}$ via a resistive voltage divider comprised of resistors $R_1$ and $R_2$. Vout sense module 104 determines the feedback voltage Vfb by sampling the voltage $V_{SENSE}$ at the end of the transformer reset time in each switching cycle of the power converter 100. Compensation module 106 uses the feedback voltage Vfb to determine the control voltage Vc. Control voltage Vc is a parameter indicating the extent of power supply loading, i.e., how much energy has to be transferred to the load per switching cycle in order to maintain the required output voltage.

FIG. 1B illustrates an example of circuitry of the compensation module generating the control voltage Vc. Inside the compensation module 106 is a digital error generator 152 that determines the difference between digital voltage feedback value $V_{fb}$ and a digital reference voltage value $V_{REF}$ corresponding to a target (regulated) output voltage. The resulting digital error signal 154 is input to a P-I function (proportional-integral function) 160 comprised of an integrator 164 and a proportional block 162. Integrator 164 integrates digital error signal 154 over all the previous switching cycles or a predetermined number of previous switching cycles, whose output is added to a scaled value (scaled by coefficient Kp in proportional block 162) of the digital error signal 154 in adder 166 to generate control voltage Vc. Thus, control voltage Vc indicates the extent of power supply loading, i.e., how much energy has to be transferred to the load per switching cycle in order to maintain the required output voltage. In general, an increasing control voltage Vc indicates that the output current is lower than desired and should be increased, and a decreasing control voltage Vc indicates that the output current is higher than desired and should be decreased. Although FIG. 1B illustrates a digital implementation of generating the control voltage Vc, other analog implementations can be used to generate a similar parameter reflecting the extent of power supply loading.

As can be seen from above, the control voltage Vc indicates the extent of power supply loading, i.e., the output current or load in the switching power supply. Thus, many conventional switching power supplies use this control voltage Vc as the sole parameter to detect low load conditions.

However, using the control voltage Vc to detect low load conditions may not be desirable or accurate, if the switching frequency of the switching power converter is not constant. This is because the control voltage Vc does not always correctly identify light load conditions. For example, in the flyback power supply of FIG. 1A operating in discontinuous conduction mode (DCM), the output power $P_{out}$ can be expressed as:

$$P_{out} = \frac{(V_{in}T_{on})^2}{2L_m}f_s\eta \quad \text{(Equation 1)}$$

for VinTon control, or $$P_{out} = \frac{1}{2}L_m(I_{pri\_pk})^2 f_s\eta \quad \text{(Equation 2)}$$

for primary side current control, where $P_{out}$ is the output power of the switching power converter, $V_{in}$ is the rectified input (line) voltage, $T_{on}$ is the turn-on time of switch Q1, $L_m$ is the magnetizing inductance of transformer T1, $f_s$ is the switching frequency, $\eta$ is the conversion efficiency, $I_{pri\_pk}$ is the peak primary side current. The control voltage Vc determines VinTon or Ipri_pk. In both control methods, the square of the output voltage of the loop compensation module 106 (control voltage) $V_c^2$ is proportional to the output power $P_{out}$. In conventional PWM (Pulse Width Modulation) or free-running VMS (Valley Mode Switching) control methods, high control voltage Vc represents high output power. Therefore, control voltage Vc is conventionally used to detect light load conditions. However, if there is large reduction of switching frequency $f_s$ over a short load range, higher Vc does not necessarily represents higher output power if the switching frequency changes.

Furthermore, when light load conditions are detected, conventional switching power supplies may lower the switching frequencies in the same manner without regard to the level of the input line voltage. The same switching frequencies are typically used regardless of the input line voltage, or even a higher switching frequency may be used at high input line voltages. This may result in additional inefficiencies because at high input line voltages the switching loss is more significant than that at low input line voltages.

SUMMARY OF THE INVENTION

Embodiments of the present invention include a switching power converter in which low load conditions are detected based on ratio of a first peak current value for peak current switching in constant voltage regulation mode to a second peak current value for peak current switching in constant current regulation mode. The power supply load is considered to have a low load if the ratio is lower than a predetermined threshold.

Once a low load condition is detected, the switching frequency of the switching power converter is reduced to a level that minimizes switching loss in the power converter. In addition, the switching power converter also reduces the switching frequency according to the sensed input line voltage. An offset is added to the switching period to reduce the switching frequency of the switching power converter, as the input line voltage is increased.

Using the ratio of the first peak current value for peak current switching in constant voltage regulation mode to the second peak current value for peak current switching in constant current regulation mode to detect low load conditions in the switching power converter has several advantages, including removing the sensitivities of low load detection caused by changes in the input line voltage, magnetizing inductance of the transformer in the switching power converter, and the switching frequency, and immunity to these changes brings more accurate detection of low load conditions. Also, since the switching frequency is further reduced when the input line voltage is increased, additional gains in efficiency can be achieved in the switching power converter of the present invention.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

According to various embodiments of the present invention, a switching power converter detects low load conditions based on the ratio of a first peak current value for peak current switching in constant voltage regulation mode to a second peak current value for peak current switching in constant current regulation mode. The power supply load is considered to have a low load if the ratio is lower than a predetermined threshold. Once a low load condition is detected, the switching frequency of the switching power converter is reduced to a level that minimizes switching loss in the power converter. In addition, the switching power converter also reduces the switching frequency according to the sensed input line voltage. An offset is added to the switching period to reduce the switching frequency of the switching power converter, as the input line voltage is increased.

Figure 1A:
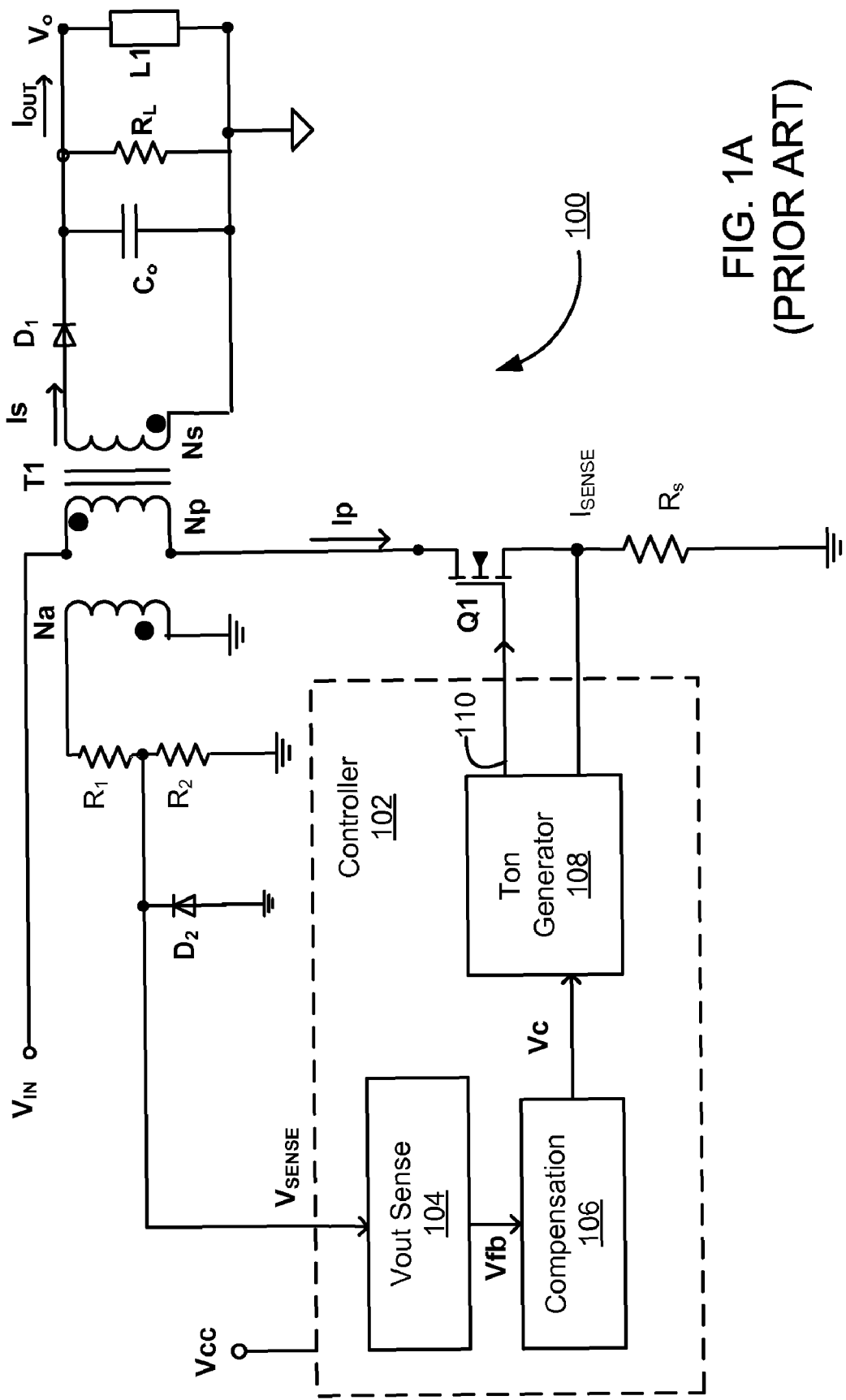
FIG. 1A conceptually illustrates a conventional flyback type AC-DC switching power converter.
Figure 1B:
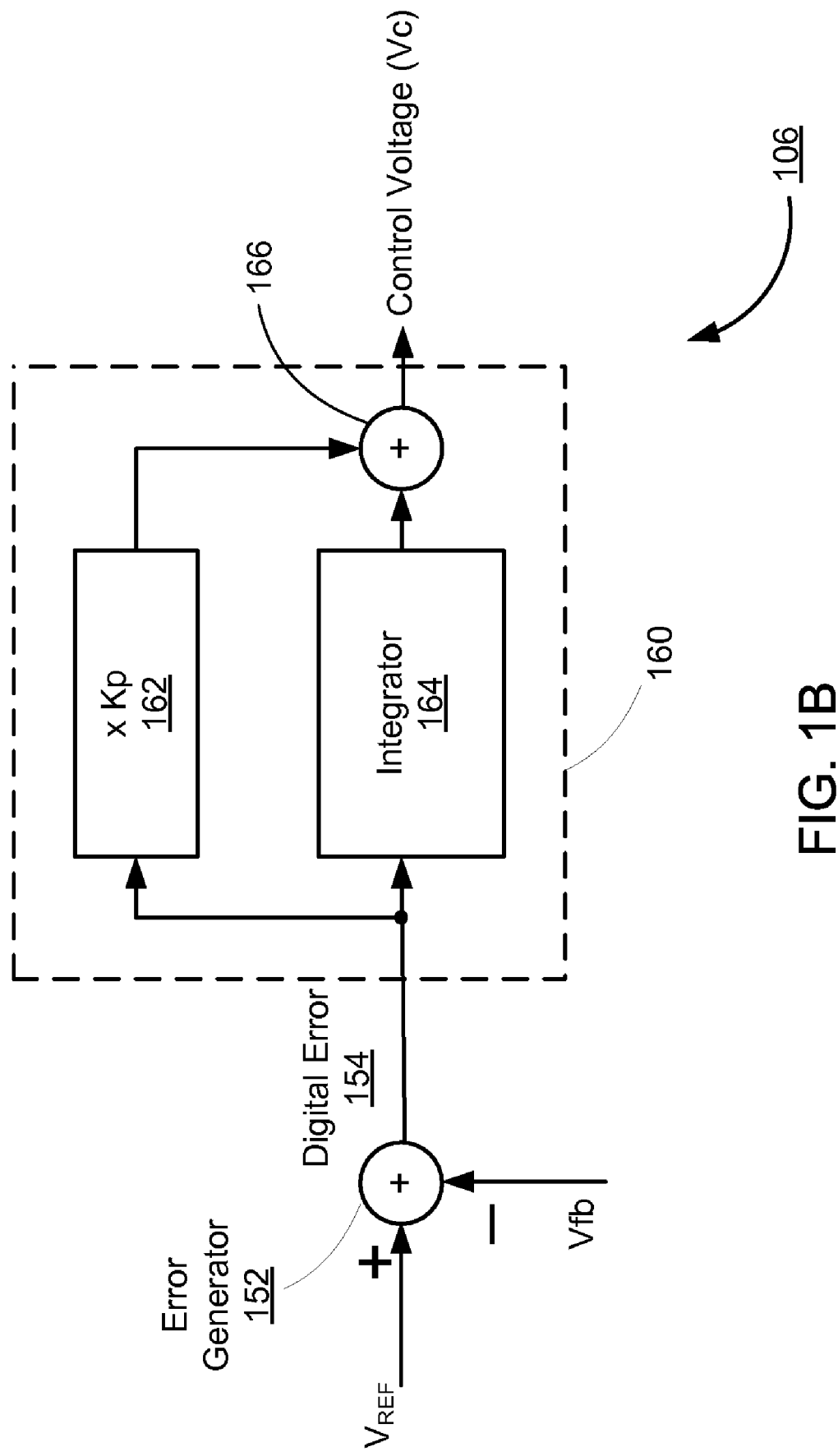
FIG. 1B illustrates an example of conventional circuitry of the compensation module generating the control voltage Vc.
Figure 2A:
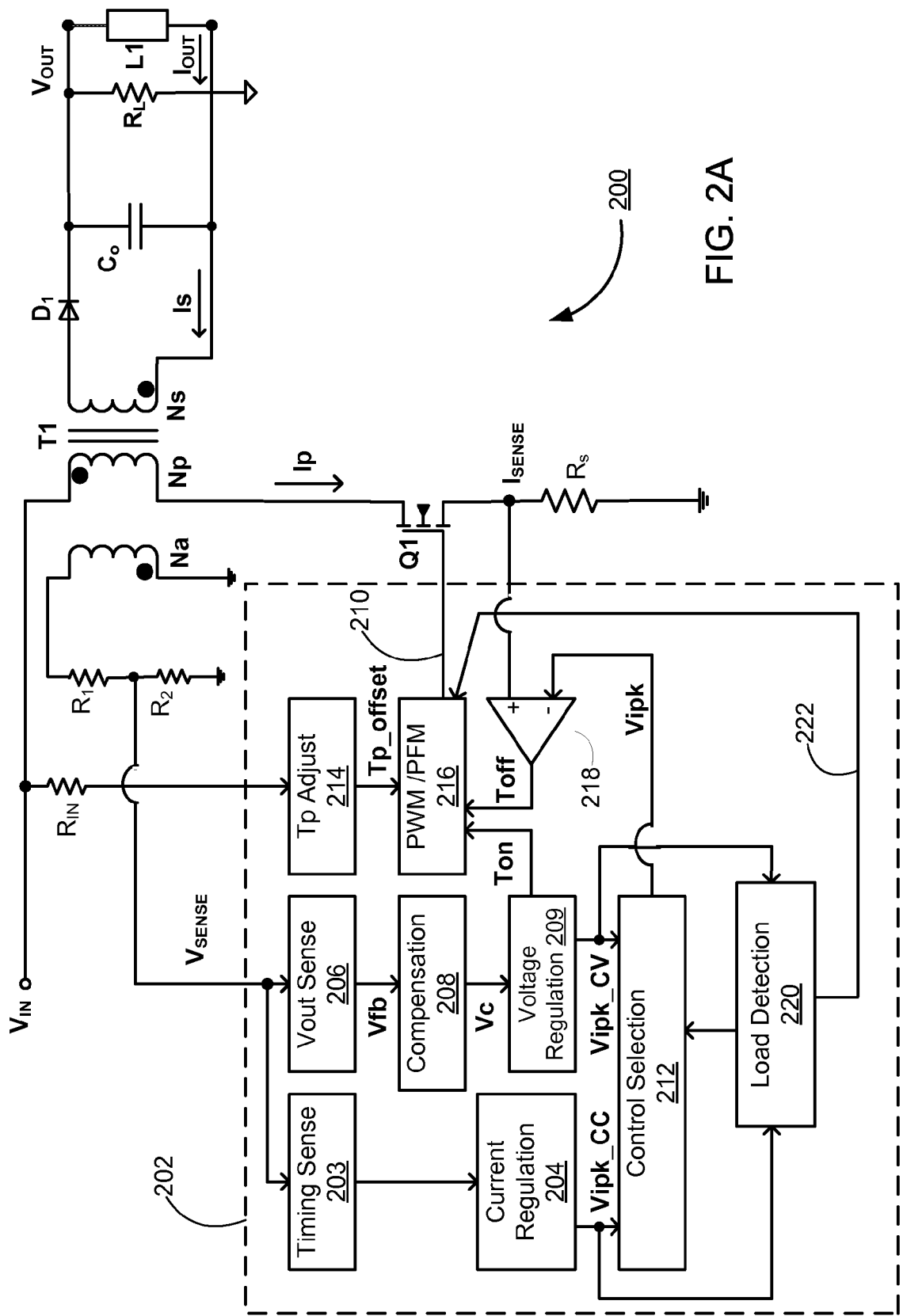
FIG. 2A illustrates a flyback type AC-DC switching power converter, according to one embodiment of the present invention.

FIG. 2A conceptually illustrates a flyback type AC-DC switching power converter, according to one embodiment of the present invention. The power converter 200 includes a transformer T1, diode $D_1$, a capacitor $C_o$, a power MOSFET switch Q1, resistors $R_1$, $R_2$, $R_{IN}$, and a controller 202. Controller 202 generates the output drive signal 210 that drives switch Q1. The AC power is received from an AC power source (not shown) and is rectified to provide the regulated DC input voltage $V_{IN}$. The input power is stored in transformer T1 while the switch Q1 is turned on because the diode $D_1$ becomes reverse biased when the switch Q1 is turned on. The rectified input power is then transferred to the load L1 across the capacitor $C_o$ while the switch Q1 is turned off because the diode $D_1$ becomes forward biased when the switch Q1 is turned off. Diode $D_1$ functions as an output rectifier and capacitor $C_o$ functions as an output filter. The resulting regulated output voltage $V_o$ is delivered to the load L1. Resistor $R_L$ is a pre-load that is typically used for stabilizing the output at no load conditions.

Controller 202 includes a timing sense module 203, a current regulation module 204, a Vout sense module 206, a loop compensation module 208, a voltage regulation module 209, a control selection module 212, a load detection module 220, a switching period (Tp) adjustment module 214, an Ipeak comparator 218, and a PWM/PFM control module 216. Controller 202 can employ any one of a number of well known modulation techniques, such as pulse-width-modulation (PWM) or pulse-frequency-modulation (PFM), to control the ON and OFF states and duty cycles of power switch Q1. Thus, PWM/PFM control module 216 generates appropriate switch drive pulses 210 to control the on-times and off-times of power switch Q1 and regulate the output voltage $V_o$, using a feedback loop based on the sensed output voltage $V_o$ and the sensed primary side current Ip in previous switching cycles of the switching power converter.

The voltage $I_{SENSE}$ is used to sense the primary current Ip through the primary winding Np and switch Q1 in the form of a voltage across sense resistor $R_s$. The voltage $I_{SENSE}$ is compared in comparator 218 with a voltage Vipk corresponding to a peak primary current. If the voltage $I_{SENSE}$ exceeds the voltage Vipk, output Toff of comparator 218 becomes logic level HIGH, causing PWM/PFM control module 216 to generate the output drive signal 210 to turn off power switch Q1 and thereby implement peak current mode switching to limit the primary current Ip when it reaches the peak current threshold value. The voltage Vipk is a value selected by control selection module 212 as either a current regulation peak current value Vipk_CC or a voltage regulation peak current value Vipk_CV, whose generation is now explained below in more detail.

The output voltage $V_o$ is reflected across auxiliary winding Na of transformer T1, which is input to the Vout sense module 206 and timing sense module 203 as the voltage $V_{SENSE}$ via a resistive voltage divider comprised of resistors $R_1$ and $R_2$. Vout sense module 206 determines the feedback voltage Vfb by sampling the voltage $V_{SENSE}$ at the end of the transformer reset time in each switching cycle of the power converter 200 and scaling the sampled voltage to a comparable level for comparison with the target regulated output voltage. Compensation module 208 uses the feedback voltage Vfb to determine the control voltage Vc. As explained above, control voltage Vc is a parameter indicating the extent of power supply loading, i.e., how much energy has to be transferred to the load per switching cycle in order to maintain the required output voltage. Based on the control voltage Vc, voltage regulation block 209 determines the peak current value Vipk_CV to be used in control of the power converter 200 in constant voltage (CV) mode. Vipk_CV is a scaled version of Vc. Vipk_CV is then provided to control selection module 212 and load detection module 220.

Timing sense module 203 also detects a variety of timing parameters of the switching power converter 100 based on the $V_{SENSE}$ signal, including the switching period (Tp), transformer reset time (Trst), etc. Based on the detected timing parameters, current regulation block 204 determines the peak current value Vipk_CC to be used in control of the power converter 200 in constant current (CC) mode, which is then output to control selection module 212 and load detection module 220. For example, one method of determining the peak current value Vipk_CC for use in CC mode based on the transformer reset time is described in detail in U.S. Pat. No. 7,443,700 issued on Oct. 28, 2008 to Yan et al., which is incorporated by reference herein in its entirety. In U.S. Pat. No. 7,443,700, it is explained that Vipk_CC can be determined as:

$$\text{Vipk\_CC} = \frac{2T_p I_{AS} R_s}{T_{rst} N}, \quad \text{(Equation 3)}$$

where $$I_{AS} = \frac{I_{PS} T_{rst}}{2T_p}$$

is the average output current of the power converter 200, $I_{PS}=I_{PP}N$ is the output secondary peak current, $I_{PP}$ is the predetermined primary peak current, N is the turns ratio (Np/Ns) of transformer T1, $T_{rst}$ is the transformer reset time of transformer T1, $T_p$ is the switching period of the switching power converter 200.

Figure 4:
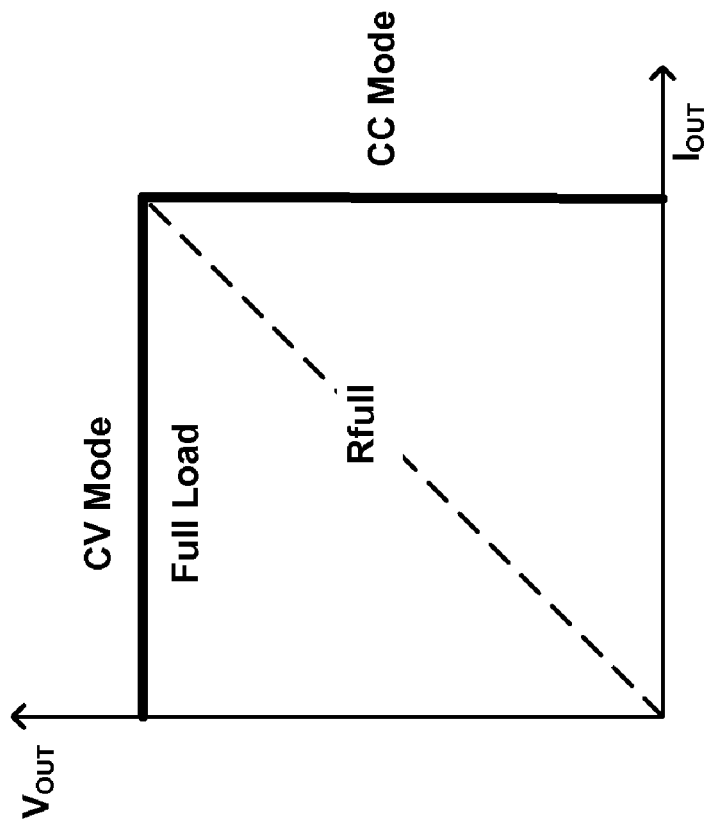
FIG. 4 illustrates the V-I curve according to which the switching power converter of FIG. 2A is controlled, according to one embodiment of the present invention.

Control selection module 212 selects either Vipk_CC or Vipk_CV to output as the peak current value Vipk, depending upon whether switching power converter is operating in constant current (CC) mode or constant voltage (CV) mode, respectively. As explained above, the peak current value Vipk is then compared with the voltage $I_{SENSE}$ representing the primary current Ip to implement peak current mode switching. As shown in FIG. 4, which illustrates the V-I curve according to which the switching power converter of FIG. 2A is controlled, the output voltage ($V_{OUT}$) of power converter 200 is constant (i.e., power converter is operated in CV mode) if the resistance of load L1 is higher than Rfull. However, if the resistance of load L1 is lower than Rfull, the output current ($I_{OUT}$) is maintained constant (i.e., power converter is operated in CC mode).

According to one embodiment of the present invention, load detection module 220 determines the state of the load L1 also based on the peak current values Vipk_CC and Vipk_CV. The average output current $I_o$ of power converter 200 can be expressed as:

$$I_o = \frac{1}{2} n I_{pri\_pk} \frac{T_{rst}}{T_p}, \quad \text{(Equation 4)}$$

where n is the transformer turns ratio n=Np/Ns, $I_{pri\_pk}$ is the peak primary current, $T_{rst}$ is the transformer reset time, and $T_p$ is the switching period. In any PWM or VMS control, the CC mode control equation is:

$$V_{ipk\_cc} = K_{cc} \frac{T_p}{T_{rst}} (K_{cc} \text{ is a constant}). \quad \text{(Equation 5)}$$

In CV mode, peak primary current $I_{pri\_pk}$ is given by current sensing resistor $R_s$ and $V_{ipk\_cv}$:

$$I_{pri\_pk} = \frac{V_{ipk\_cv}}{R_s}. \quad \text{(Equation 6)}$$

Therefore, from equation 4, equation 5, and equation 6, it follows that:

$$I_o = \frac{nK_{cc}}{2R_s} \frac{V_{ipk\_cv}}{V_{ipk\_cc}}. \quad \text{(Equation 7)}$$

At the full output power point (load resistance of load L1 is Rfull in FIG. 4), the voltage regulation module 209 and the current regulation module 204 should send out the same peak current values regardless of whether the switching power converter 200 operates in CV mode or CC mode, i.e., $V_{ipk\_cv}=V_{ipk\_cc}$. Thus, the maximum output current $I_{o\_max}$ is:

$$I_{o\_max} = \frac{nK_{cc}}{2R_s}. \quad \text{(Equation 8)}$$

Therefore, at any operating point in CV mode, the actual output current $I_{OUT}$ can be defined as a ratio to its maximum value:

$$\frac{I_{OUT}}{I_{o\_max}} = \frac{V_{ipk\_cv}}{V_{ipk\_cc}}, \text{ where} \quad \text{(Equation 9)}$$

$0 \leq \frac{V_{ipk\_cv}}{V_{ipk\_cc}} \leq 1$ in CV mode and $\frac{V_{ipk\_cv}}{V_{ipk\_cc}} > 1$ in CC mode.

Thus, the ratio $$\frac{V_{ipk\_cv}}{V_{ipk\_cc}}$$

between the peak current values for regulation of the switching power converter 200 in CV mode and CC mode can be used to determine the extent of output power or power supply loading. In other words, load detection module 220 uses this ratio $$\frac{V_{ipk\_cv}}{V_{ipk\_cc}}$$

to determine power supply loading. In one embodiment, load detection module 220 determines that the power converter 200 has a low load condition if the ratio $$\frac{V_{ipk\_cv}}{V_{ipk\_cc}}$$

has a value less than 0.4 (40%).

Using the ratio $$\frac{V_{ipk\_cv}}{V_{ipk\_cc}}$$

to detect power supply load conditions has the advantage that such calculation result is not sensitive to changes in the input line voltage, the switching frequency, or the magnetizing inductance Lm of transformer T1. Compared to the conventional technique of using solely the control voltage Vc to detect power supply load conditions, the ratio $$\frac{V_{ipk\_cv}}{V_{ipk\_cc}}$$

provides more accurate detection, is linearly-mapped to the output load current, and can tolerate large frequency reductions across a short load range.

Load detection module 220 provides the detected load status to control selection module 212 and PWM/PFM module 216 for use in selecting the appropriate power supply control mode for control of power converter 200. For example, if a low load condition is detected, PWM/PFM module 216 may reduce the switching frequency in PFM mode to a level that minimizes switching loss in power converter 200.

In addition, controller 202 adjusts the switching frequency (switching period) not only based on the detected load conditions but also based on the level of the input line voltage $V_{IN}$. In this regard, Tp adjust module 214 receives the input line voltage $V_{IN}$ via input resistor $R_{IN}$ and determines the level of the input line voltage $V_{IN}$ in real time, and provides a switching period offset signal Tp_offset to PWM/PFM module 216. PWM/PFM module 216 adds the switching period offset signal Tp_offset to the switching period Tp, thereby adjusting the switching period based on the level of the input line voltage $V_{IN}$.

Figure 5:
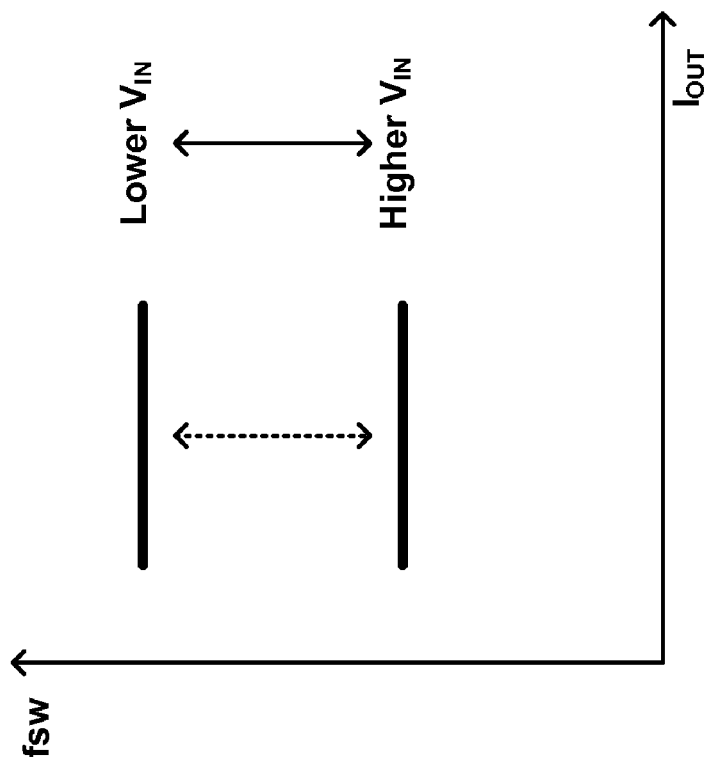
FIG. 5 illustrates how the switching frequency of the switching power converter of FIG. 2A is adjusted with different levels of input line voltage, according to one embodiment of the present invention.

FIG. 5 illustrates how the switching frequency of the switching power converter of FIG. 2A is adjusted with different levels of input line voltage, according to one embodiment of the present invention. For universal input line application, the ratio of the highest input voltage to the lowest input voltage in a switching power converter can be as high as 4 times. The switching loss at a high input voltage is much higher than the switching loss at a low input voltage, if the switching power converter operates at the same switching frequency. To further optimize the efficiency of power converter 200, Tp adjust module 214 causes the switching frequency $f_{sw}$ to be adjusted (i.e., generates Tp_offset) such that the switching frequency $f_{sw}$ becomes lower as the input line voltage becomes higher, as shown in FIG. 5. Tp adjust module 214 causes the switching frequency $f_{sw}$ to be lowered by adding an offset Tp_offset to the switching period Tp. As a result, switching power converter 200 achieves additional efficiency by lowering the switching frequency as the input line voltage increases. In one embodiment, such Tp_offset adjustment always occurs as the input voltage becomes higher regardless of load condition. In another embodiment, such Tp_offset adjustment occur as the input voltage becomes higher only when low load conditions are detected.

Figure 2B:
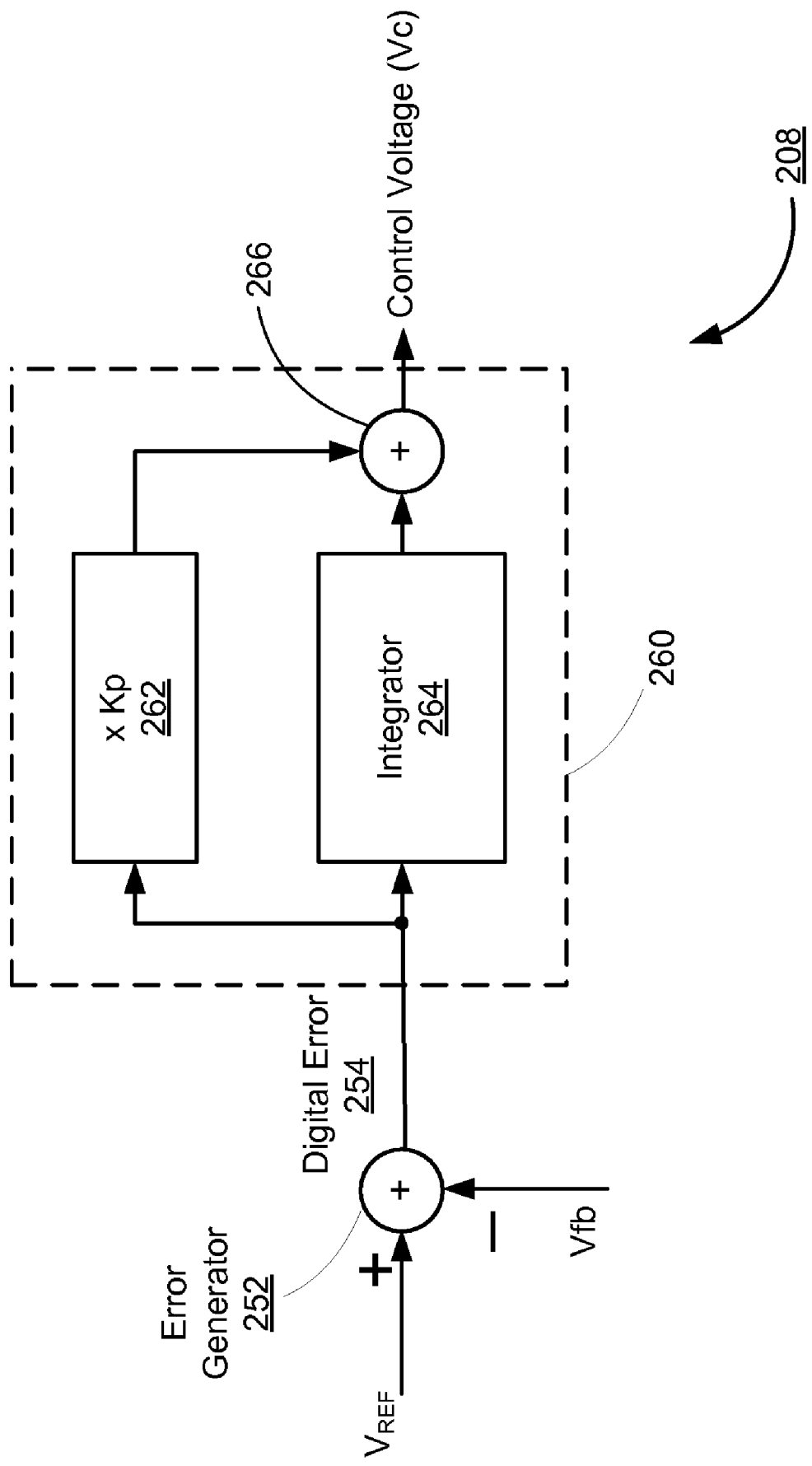
FIG. 2B illustrates an example of circuitry of the compensation module in FIG. 2A generating the control voltage Vc.

FIG. 2B illustrates an example of circuitry of the compensation module in FIG. 2A generating the control voltage Vc. Inside the compensation module 208 is a digital error generator 252 that determines the difference between digital voltage feedback value $V_{fb}$ and a digital reference voltage value $V_{REF}$ corresponding to a target (regulated) output voltage. The resulting digital error signal 254 is input to a P-I function (proportional-integral function) 260 comprised of an integrator 264 and a proportional block 262. Integrator 264 integrates digital error signal 254 over a predetermined number of switching cycles, whose output is added to a scaled value (scaled by coefficient Kp in proportional block 262) of the digital error signal 254 in adder 266 to generate control voltage Vc. Thus, control voltage Vc indicates the extent of power supply loading, i.e., how much energy has to be transferred to the load per switching cycle in order to maintain the required output voltage. In general, an increasing control voltage Vc indicates that the output voltage $V_{OUT}$ is lower than desired and should be increased, and a decreasing control voltage Vc indicates that the output voltage $V_{OUT}$ is higher than desired and should be decreased. Therefore, if error signal 254 indicates that the output voltage $V_{OUT}$ (Vfb) is lower than desired, then control voltage Vc will be increased by P-I function 260, which will in turn cause the on-time (Ton) of the switch Q1 to increase and thereby transfer more energy to the load L1 per switching cycle to maintain the required output regulation voltage. If error signal 254 indicates that the output voltage $V_{OUT}$ (Vfb) is higher than desired, then the control voltage Vc will be decreased by P-I function 260, which will in turn cause the on-time (Ton) of the switch Q1 to decrease and thereby transfer less energy to the load L1 per switching cycle to maintain the required output regulation voltage. Also, as explained above, Vipk_CV is a scaled value of this control voltage Vc generated by compensation module 208 for peak current switching in CV mode. Although FIG. 2B illustrates one example of a digital implementation of circuitry for generating the control voltage Vc, other digital or analog implementations can be used to generate a similar parameter reflecting the extent of power supply loading.

Figure 3:
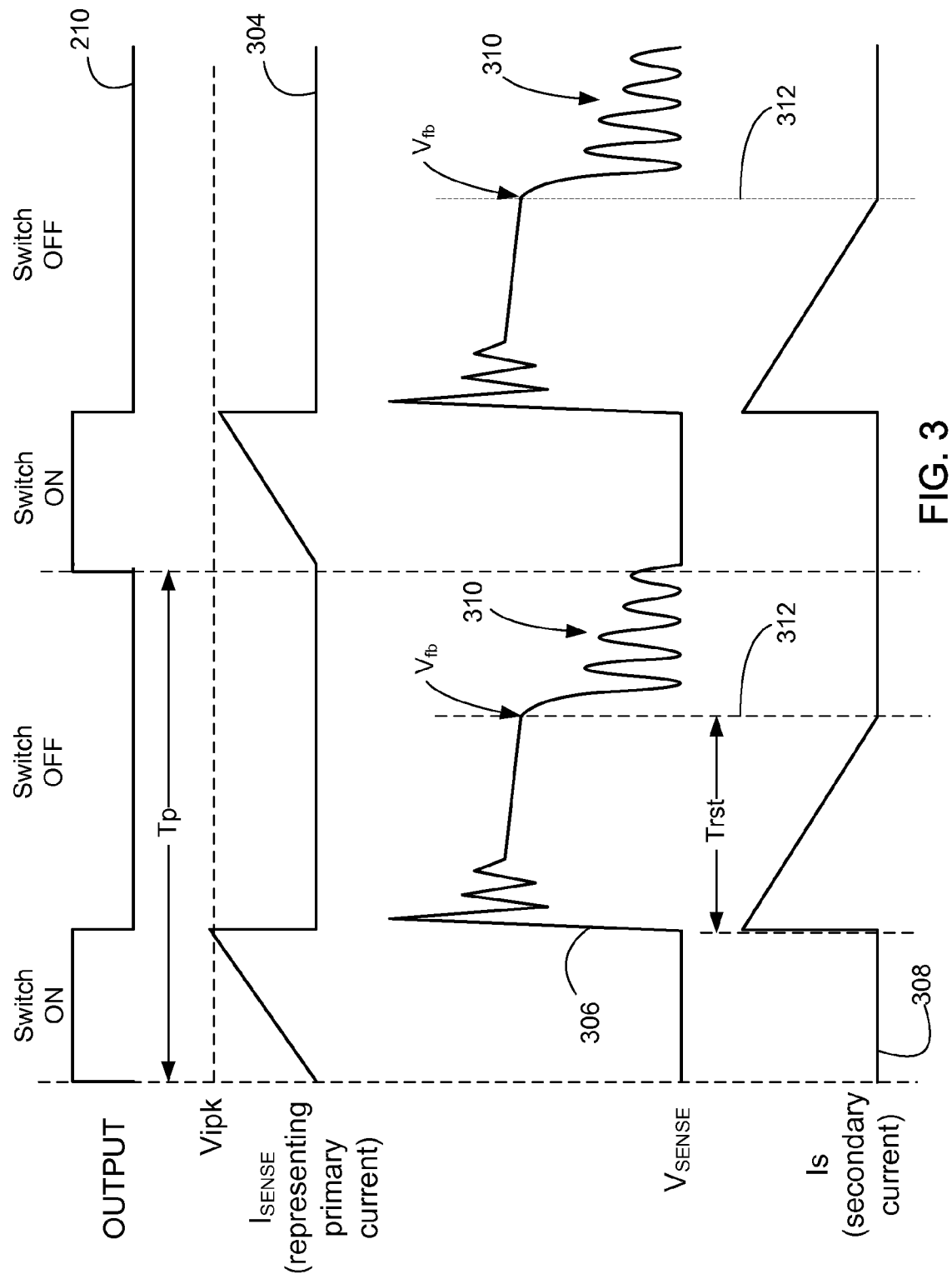
FIG. 3 illustrates the operational waveforms of the switching power converter of FIG. 2A, according to one embodiment of the present invention.

FIG. 3 illustrates the operational waveforms of the switching power converter of FIG. 2A, according to one embodiment of the present invention. Referring to FIG. 3 together with FIG. 2A, controller 202 outputs a control signal 210 (OUTPUT, in current form), which defines the ON and OFF states of power switch Q1. The primary current $I_p$ through switch Q1 and primary winding Np is represented as the voltage, $I_{SENSE}$ 304. When control signal 210 is high and thus power switch Q1 is in the ON state, primary current (represented by $I_{SENSE}$) 304 ramps up. The rate of ramp up of primary current ($I_{SENSE}$) 304 is predominantly based on the input line voltage $V_{IN}$ and the magnetizing inductance Lm of primary winding Np. When power switch Q1 is in the ON state, output rectifier diode $D_1$ is reversed biased, and thus $V_{SENSE}$ voltage 306 (representing the output voltage $V_{OUT}$) is zero and output current (secondary current) Is 308 is also equal to 0 A. Thus, while power switch Q1 is in the ON state, energy is stored in power transformer T1 but not delivered to the load L1 at the output.

When primary current ($I_{SENSE}$) 304 reaches the peak current mode threshold Vipk (either Vipk_CC or Vipk_CV, depending on CC mode or CV mode), control signal 210 becomes low, and the power switch Q1 is switched to the OFF state. As a result, output rectifier diode $D_1$ becomes forward biased and energy stored in transformer T1 is delivered to the secondary winding Ns based on the turns ratio (Np/Ns) between the primary winding Np and the secondary winding Ns. As the energy stored in power transformer T1 is delivered to the secondary winding Ns, secondary current Is 308 spikes up and then starts to ramp down. Similarly, the $V_{SENSE}$ voltage 306 also spikes up and then slowly ramps down. When all of the energy stored in power transformer T1 is delivered to the secondary side Ns, secondary current Is 308 becomes equal to 0 A, which point is also referred to as the transformer reset point 312. The period Trst during which secondary current Is spikes up and then reaches zero is referred to as the transformer reset time Trst. Also, the complete period of the OUTPUT signal 210 is referred to as the switching period Tp. Note that the feedback voltage $V_{fb}$ (explained above with reference to FIG. 2A) is sampled from $V_{SENSE}$ at the transformer reset point 312. If power switch Q1 remains in the OFF state beyond the transformer reset point 312, the Vsense voltage exhibits high frequency ringing, generally occurring during voltage ringing period 310, with the ringing decaying. Then, controller 202 (PWM/PFM module 216) will determine the next turn-on time of power switch Q1 based on the selected operation mode (PWM or PFM and CV mode or CC mode) and generate a high control signal 210 to turn on the power switch Q1 for the next switching cycle, and the above described operation is repeated in the next and additional subsequent switching cycles.

Upon reading this disclosure, those of skill in the art will appreciate still additional alternative designs for detecting low load conditions in switching power converters and controlling the switching frequency of the switching power converters. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the present invention.

What is claimed is:

1. A method of operating a switching power converter, the method comprising:
   determining a first peak current value for peak current switching of a switch in the switching power converter in constant voltage regulation mode, the first peak current value being a first current limit of current through the switch during each switching cycle of the switching power converter in the constant voltage regulation mode;
   determining a second peak current value for peak current switching of the switch in constant current regulation mode, the second peak current value being a second current limit of current through the switch during each switching cycle of the switching power converter in the constant current regulation mode; and
   detecting a light load condition in the switching power converter based upon the first peak current value relative to the second peak current value.

2. The method of claim 1, wherein the light load condition is detected based upon a ratio of the first peak current value to the second peak current value.

3. The method of claim 2, wherein the light load condition is detected responsive to the ratio of the first peak current value to the second peak current value being less than a predetermined threshold value.

4. The method of claim 1, wherein the first peak current value is proportional to a control voltage output from a loop compensator of the switching power converter for regulating an output voltage of the switching power converter using a feedback loop.

5. The method of claim 1, wherein the switching power converter is a flyback type, and the second peak current value is inversely proportional to a transformer reset time of a transformer in the flyback type switching power converter.

6. The method of claim 1, further comprising lowering a switching frequency of the switching power converter, responsive to detecting the light load condition in the switching power converter.

7. The method of claim 1, further comprising:
   determining a level of input voltage to the switching power converter; and
   lowering a switching frequency of the switching power converter as the input voltage level is increased.

8. The method of claim 7, wherein lowering the switching frequency comprises adding an offset to a switching period of the switch of the switching power converter.

9. The method of claim 1, wherein the first peak current value and the second peak current value are represented as voltage values for comparison with another voltage value corresponding to a peak current in the switching power converter.

10. The method of claim 1, wherein the switching power converter is a primary-side feedback, flyback-type switching power converter.

11. A switching power converter comprising:
a transformer including a primary winding coupled to an input voltage and a secondary winding coupled to an output of the switching power converter;
a switch coupled to the primary winding of the transformer, current through the primary winding being generated while the switch is turned on and not being generated while the switch is turned off;
a voltage regulation module configured to determine a first peak current value for peak current switching of the switch in constant voltage regulation mode, the first peak current value being a first current limit of current through the primary winding of the transformer and the switch during each switching cycle of the switching power converter in the constant voltage regulation mode;
a current regulation module configured to determine a second peak current value for peak current switching of the switch in constant current regulation mode, the second peak current value being a second current limit of current through the primary winding of the transformer and the switch during each switching cycle of the switching power converter in the constant current regulation mode; and
a load detection module configured to detect a light load condition in the switching power converter based upon the first peak current value relative to the second peak current value.

12. The switching power converter of claim 11, wherein the load detection module detects the light load condition based upon a ratio of the first peak current value to the second peak current value.

13. The switching power converter of claim 12, wherein the load detection module detects the light load condition responsive to the ratio of the first peak current value to the second peak current value being less than a predetermined threshold value.

14. The switching power converter of claim 11, wherein the first peak current value is proportional to a control voltage output from a loop compensator of the switching power converter for regulating an output voltage of the switching converter using a feedback loop.

15. The switching power converter of claim 11, wherein the switching power converter is a flyback type, and the second peak current value is inversely proportional to a transformer reset time of the transformer coupled between the input voltage and the output of the switching power converter.

16. The switching power converter of claim 11, further comprising a control module configured to lower a switching frequency of the switching power converter, responsive to detecting the light load condition in the switching power converter.

17. The switching power converter of claim 11, further comprising a switching period adjustment module configured to determine a level of the input voltage and lower a switching frequency of the switching power converter as the input voltage is increased.

18. The switching power converter of claim 17, wherein the switching frequency is lowered by adding an offset to a switching period of the switch of the switching power converter.

19. The switching power converter of claim 11, wherein the first peak current value and the second peak current value are represented as voltage values for comparison with another voltage value corresponding to a peak current in the switching power converter.

20. The switching power converter of claim 11, wherein the switching power converter is a primary-side feedback, flyback-type switching power converter.

* * * * *